US006283570B1

(12) United States Patent
Komiya et al.

(10) Patent No.: US 6,283,570 B1
(45) Date of Patent: Sep. 4, 2001

(54) PRINTER WITH CORRECTION DATA FOR NUMBER OF TONES WHICH IS FEWER THAN NUMBER OF TONES THAT IMAGE DATA HAVE

(75) Inventors: Yasuhiro Komiya, Hino; Ganglu Jing, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/198,178

(22) Filed: Nov. 23, 1998

(30) Foreign Application Priority Data

Nov. 28, 1997 (JP) .................................................. 9-329290

(51) Int. Cl.[7] ............................ B41J 29/38; B41J 2/205; B41J 29/393; B41J 2/355

(52) U.S. Cl. ................................ 347/15; 347/14; 347/19; 347/183; 347/184

(58) Field of Search .................................. 347/7, 15, 17, 347/14, 19, 43, 183, 184, 240

(56) References Cited

U.S. PATENT DOCUMENTS 5,285,220 * 2/1994 Suzuki et al. .................... 346/140 R
5,823,690 * 10/1998 Narushima et al. ............ 400/120.07
5,997,123 * 12/1999 Takekoshi et al. .................... 347/14
6,027,196 * 2/2000 Gotoh et al. ............................ 347/7

* cited by examiner

*Primary Examiner*—John Barlow
*Assistant Examiner*—An H. Do
(74) *Attorney, Agent, or Firm*—Frishauf, Holtz, Goodman, Langer & Chick, P.C.

(57) ABSTRACT

A printer apparatus comprises a head having k (number) printing elements for printing an image data. A printing element selecting section selects a printing element driven at the time of printing among the k printing elements of the head. An image correcting section is a section for correcting the image data previous to the printing of the image data using the head, and comprises a correction data memorizing section for memorizing a correction data for a certain single tone among n (number) tones that the image data has for each of the printing elements, a tone detecting section for detecting the tone of the image data corresponding to each of the selected printing elements of the head, and a correction data generating section for generating a correction data for each of the selected printing elements, corresponding to the tone detected by the tone detecting section, by using the correction data memorized in the correction data memorizing section.

11 Claims, 10 Drawing Sheets

PRINTER WITH CORRECTION DATA FOR NUMBER OF TONES WHICH IS FEWER THAN NUMBER OF TONES THAT IMAGE DATA HAVE

BACKGROUND OF THE INVENTION

The present invention relates to a printer apparatus.

With the development of electrical image equipment, image recording has been frequently carried out using an ink jet printer head or a thermoelectric printer head. In particular, the development of large-sized heads and multiheads is advancing for the purpose of high-speed printing.

However, in the case of printing, for example, in ink jet image printing, the amounts and the jet directions of inks jetted from respective nozzles of a printer head are scattered, and thus the scattering results in printing unevenness, such as a line to the eye. This printing unevenness becomes more conspicuous in larger-sized heads and multiheads. Thus, line-like unevenness arises periodically on a printed image at an interval of the width of the printer head. This results in a remarkable deterioration in image quality. There also arises a problem that in printing over a long period this unevenness changes with the passage of time.

U.S. Pat. No. 5,285,220 discloses a method for correcting such density unevenness.

Specifically, as shown in FIG. 17, a print image data is binarized in a binarization processing section 2, and for printing with a printer head 3, an unevenness correcting table 1 is arranged at the previous stage of the binarization processing section 2. Using this unevenness correcting table 1, the print image data is corrected. Correction of scattering in respective nozzles of the printing head makes it possible to correct density unevenness. Furthermore, considering the fact that density unevenness is different in accordance with the tone of image data to be printed even if the same nozzle is used, the correction corresponding to the tone of the image data is also carried out.

In the aforementioned U.S. Pat. No. 5,285,220, at the time of correcting each nozzle of the head, a density unevenness detecting chart is used to measure the tone characteristic of each of the nozzles, and a tone (gray level)-correcting characteristic for correcting this characteristic is memorized for each of the nozzles. In the case of, e.g., 8 bit data, however, the graduation has 256 tones and a considerably large memory capacity is necessary in order to memorize correction data for every tone for all of the nozzles. Moreover, much time is spent for detecting density unevenness using the density unevenness detecting chart of the 256 tones.

Therefore, an object of the present invention is to provide a printer apparatus that makes it possible to decrease a memory capacity for memorizing correction data necessary for correcting density unevenness and that cuts the down time for detecting the density unevenness.

BRIEF SUMMARY OF THE INVENTION

To attain the aforementioned object, a printer apparatus according to a first aspect of the present invention comprises:

- a head having k (number) printing elements for printing an image data;
- a printing element selecting section for selecting a printing element driven at the time of printing among the k printing elements of the head; and
- an image data correcting section for correcting the image data previous to the printing of the image data using the head;

wherein the image data correcting section comprises:

- a correction data memorizing section for memorizing a correction data for a certain single tone among n (number) tones that the image data has for each of the printing elements,
- a tone detecting section for detecting the tone of the image data corresponding to each of the selected printing elements of the head, and
- a correction data generating section for generating a correction data for each of the selected printing elements, corresponding to the tone detected by the tone detecting section, by using the correction data memorized in the correction data memorizing section.

Moreover, a printer apparatus according to a second aspect of the present invention:

- a head having k (number) printing elements for printing an image data;
- a printing element selecting section for selecting a printing element driven at the time of printing among the k printing elements of the head; and
- an image data correcting section for correcting the image data previous to the printing of the image data using the head;

wherein the image data correcting section comprises:

- a correction data memorizing section for memorizing correction data for correcting the image data for each of the printing elements, the number of the correction data corresponding to m ($n>m$) tones among the n tones that the image data has, and memorizing the total number $m \times k$ of the correction data for the k printing elements;
- a tone detecting section for detecting the tone of the image data, corresponding to each of the selected printing elements; and
- a reading section for reading the correction data corresponding to a tone detected in the tone detecting section from the correction data memorizing section, and for performing a correction operation to the image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

DETAILED DESCRIPTION OF THE INVENTION

Figure 1:
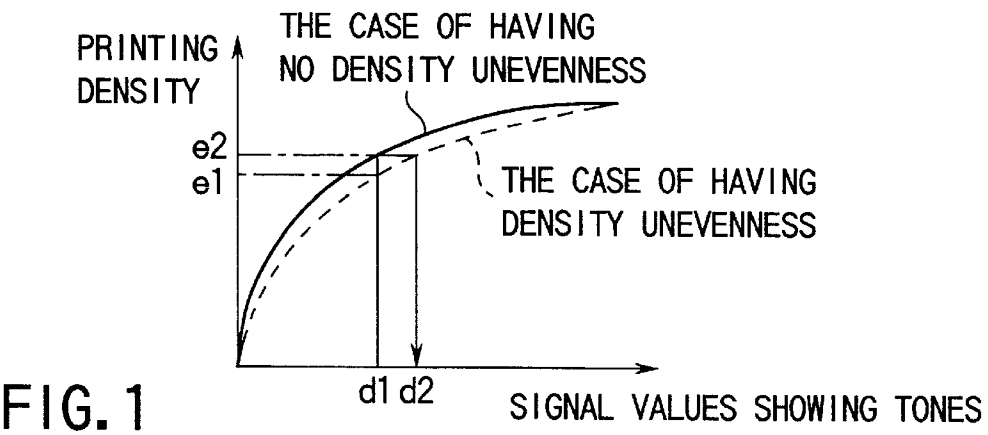
FIG. 1 is a view showing a tone characteristic of any nozzle inside a head of printer.

Referring to the attached drawings, embodiments of the present invention will be described in detail hereinafter. FIG. 1 shows a tone characteristic of any nozzle as a printing element in a head of a printer. A horizontal axial represents signal values showing tones of print image data, and a vertical axial represents corresponding print density values. Moreover, a solid line shows a characteristic in the case of having no density unevenness, and a dotted line shows a characteristic in the case of having density unevenness. In the case of having density unevenness, when a signal of signal value d1 is inputted, the resultant print density becomes e1. In the case of having no density unevenness, the resultant print density becomes e2. Therefore, it can be understood that in order to make the print density into e2 even in the case of having density unevenness, the signal value d1 of the print image data is made as correction signal value d2, and the correction signal value d2 is supplied to the head.

Figure 2:
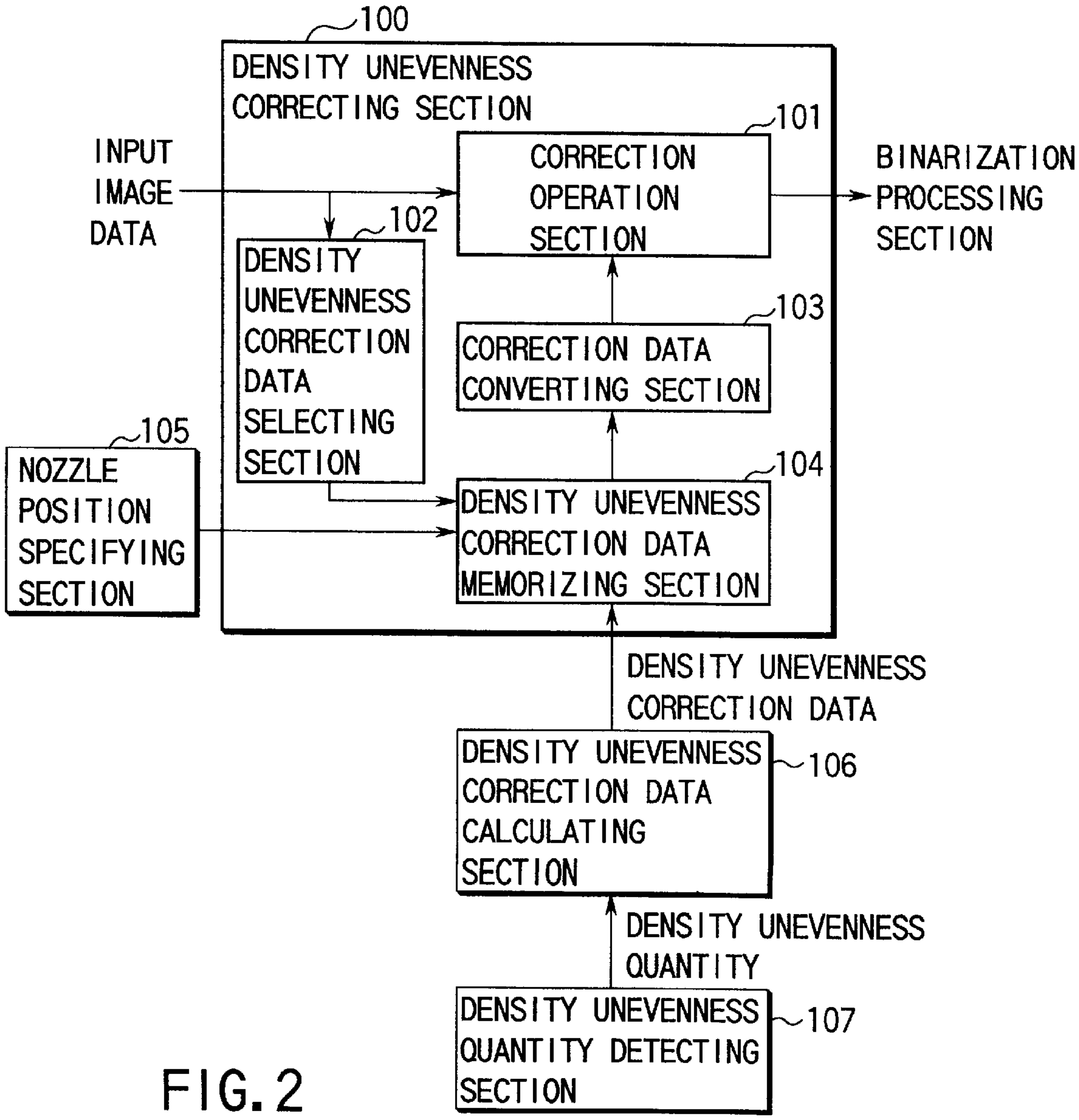
FIG. 2 is a structure view for explaining the outline of an embodiment of the present invention.

FIG. 2 is a structure view for explaining the outline of an embodiment of the present invention for generating the correction signal value d2. A print image data is subjected to a density unevenness correction processing in a density unevenness correcting section 100 before it is forwarded to a binarization processing section. That is, a density unevenness correction data selecting section 102 as a tone detecting section detects the tone of an inputted print image data, and then outputs a selection signal corresponding to the detected tone. A density unevenness correction data memorizing section 104 has a memory for memorizing given density unevenness correction data for each nozzle, and a reading section for selectively reading the density unevenness correction data memorized in the memory on the basis of a nozzle specifying signal from a nozzle position specifying section 105 as a printing element selecting section and a selection signal from the density unevenness data selecting section 102. In this embodiment, the density unevenness correcting data memorizing section 104 memorizes only the density unevenness correction data corresponding to a smaller number of tones (1 or 5 tones) than the number of all tones of print image data, that is, 256, as will described later.

The density unevenness correction data corresponding to the detected tone is read as a first correction data from the density unevenness correction data memorizing section 104, and then a correction data converting section 103 converts this read density unevenness correction data into a second correction data suitable for a correction operation in a correction operation section 101. The correction operation section 101 performs a correction operation for the print image data, using this second correction data resulting from the conversion.

The density unevenness correction data memorized in the density unevenness correction data memorizing section 104 are obtained as follows. Namely, a density unevenness quantity detecting section 107 detects density unevenness quantities using a density unevenness detecting chart described later. A density unevenness correction data calculating section 106 calculates density unevenness correction data from the detected density unevenness quantities. This calculation of the density unevenness correction data is carried out when the printer device is manufactured in a factory or the printer head is exchanged. On all such occasions, the density unevenness correction data in the density unevenness correction data memorizing section 104 are renewed.

Figure 3:
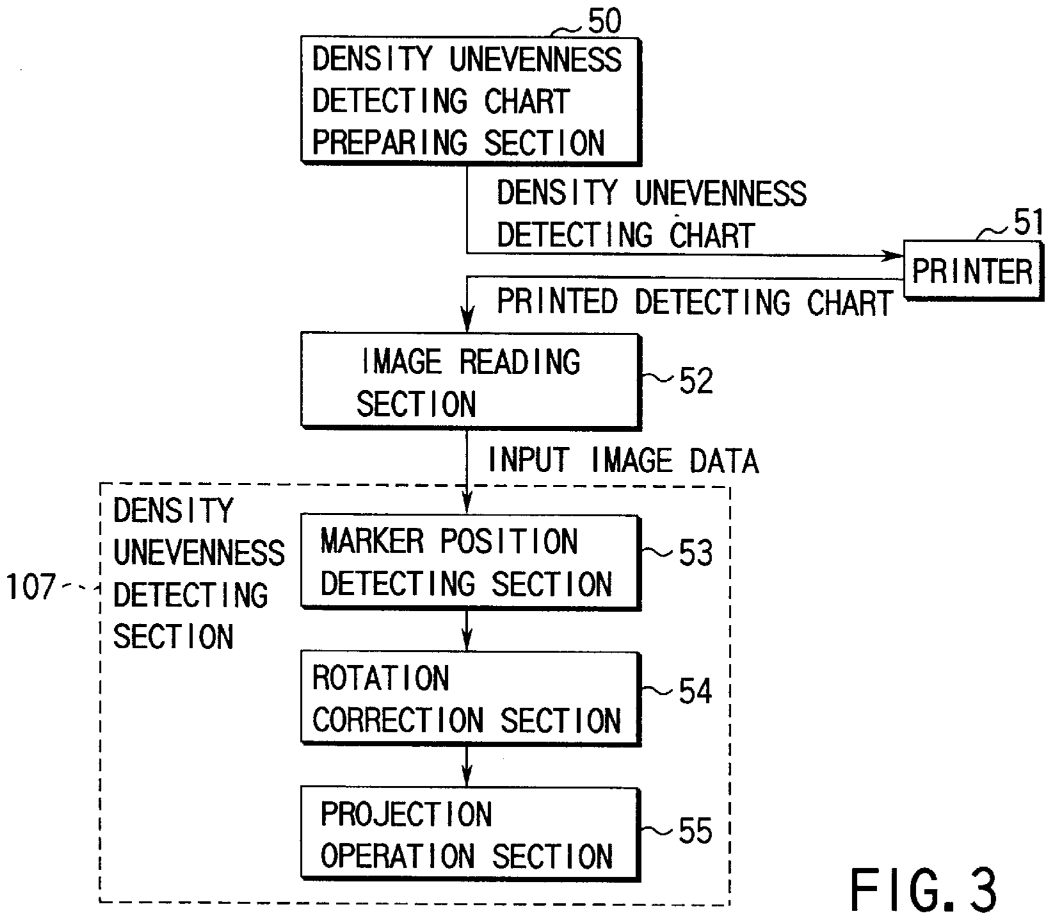
FIG. 3 is a view showing a structure used for detecting a density unevenness quantity in a density unevenness quantity detecting section.
Figure 4:
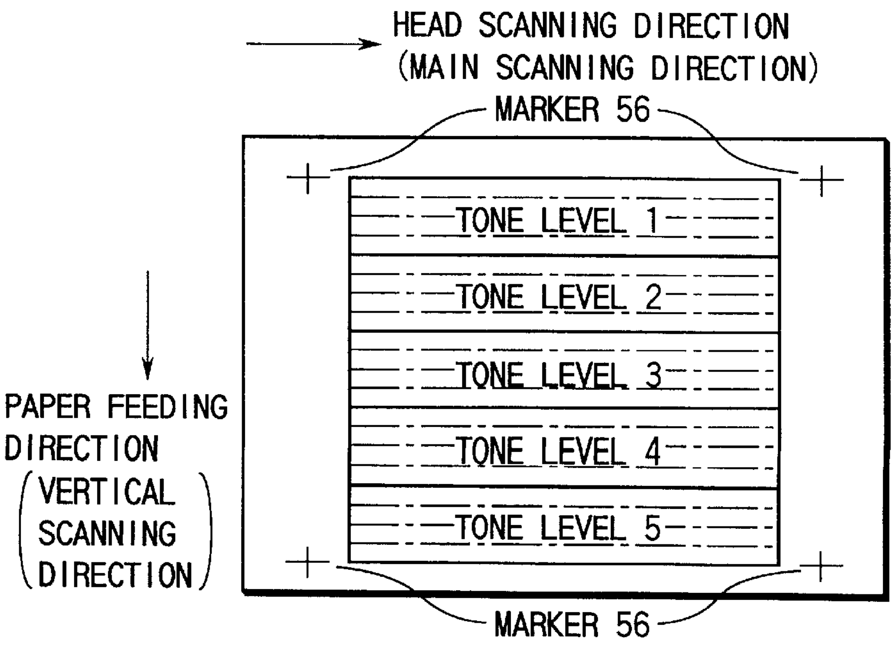
FIG. 4 is a showing an example of a density unevenness detecting chart.

In the case in which the density unevenness quantity detecting section 107 detects a density unevenness quantity, a structure shown in FIG. 3 is used to detect a density unevenness quantity of a predetermined tone. First, a density unevenness detecting chart preparing section 50 prepares a density unevenness detecting chart as shown in FIG. 4. In this case, in the present embodiment a density unevenness detecting chart for 5 tones, which are fewer than the number of tones that the print image data can have, for example, 256 tones is prepared. This makes it possible to reduce a density unevenness detecting time to a larger extent, as compared with the case in which a density unevenness detecting chart for 256 tones is prepared as in the prior art. The density unevenness detecting chart for each of the tones is composed of pixel numbers corresponding to the width over which the head scans 4 times. (The width for each scanning is shown by alternate long and short dash lines.) Therefore, in the case in which the head is composed of, for example, 256 nozzles, the chart for each tone is composed of 256×4=1024 pixels along the paper feeding direction.

Next, the prepared density unevenness detecting chart is inputted into a printer 51 for which a density unevenness correction wants to be carried out and then printing is performed. At the time of the printing, the density unevenness correcting section of the printer 51 is controlled so that a density unevenness correction operation is not carried out. Thereafter, an image reading section 52 such as a flatbed scanner reads the printed image on the density unevenness detecting chart printed by the printer, and then the obtained print image data is inputted as an input image data into the density unevenness quantity detecting section 107. In a marker position detecting section 53 of the density unevenness quantity detecting section 107, the positions of makers 56 shown in FIG. 4 are detected and then a rotation correction of the image is performed in a rotation correction section 54. This rotation correction is carried out to correct the inclined arrangement of the density unevenness detecting chart in relative to the scanning direction of the image reading section 52. In a projection operation section 55, the rotation-corrected image data is subjected to a projection operation in the head scanning direction (the main scanning direction), and further the operation-results obtained at this time are averaged by dividing the number of scanning times for each of tones so as to output a density unevenness quantity of each of the tones.

Figure 5:
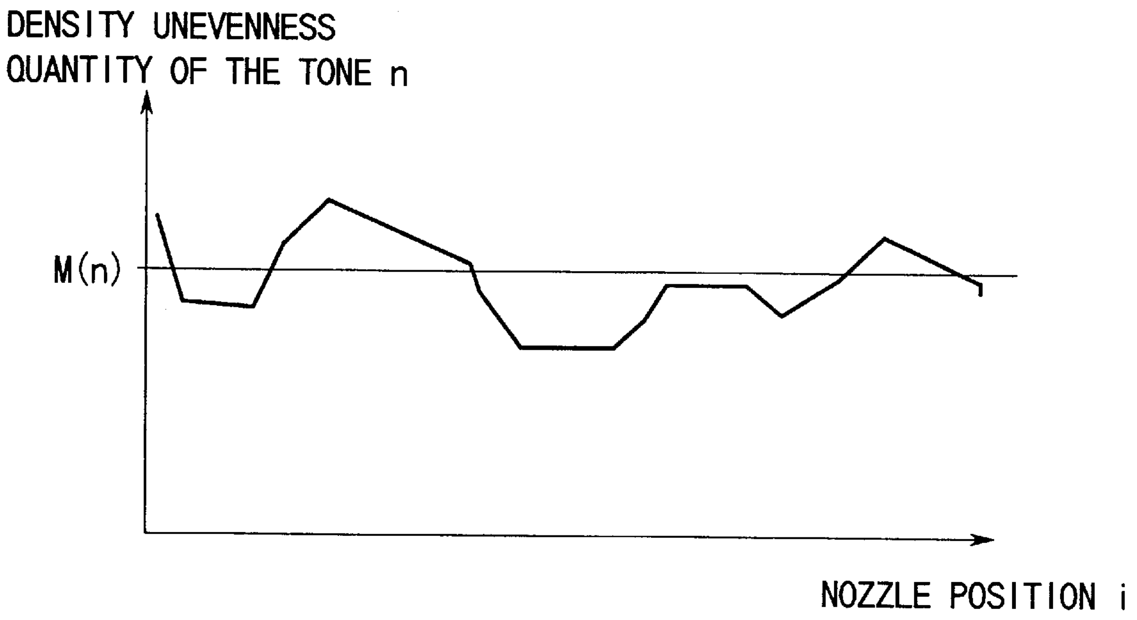
FIG. 5 is a characteristic view showing the relationship between nozzle positions and density unevenness quantities of tone n.

A density unevenness correction data calculating section 106 calculates the average M (n) of the density unevenness quantities of a given tone n calculated for the respective nozzles (see FIG. 5) and then calculates, for a density value di (n) of each of the nozzles, a density unevenness correction data Ci (n) from the following equation:

$$Ci(n)=M(n)/di(n),$$

In this equation, i shows the position of the nozzle. In the case of a head composed of 256 nozzles, i=1 to 256. Moreover, n shows a tone. In the case of 8 bit tones, n=1 to 256.

The density unevenness correction data are forwarded to the density unevenness correcting section 100, and the correction of density unevenness is carried out by the following method.

Figure 6:
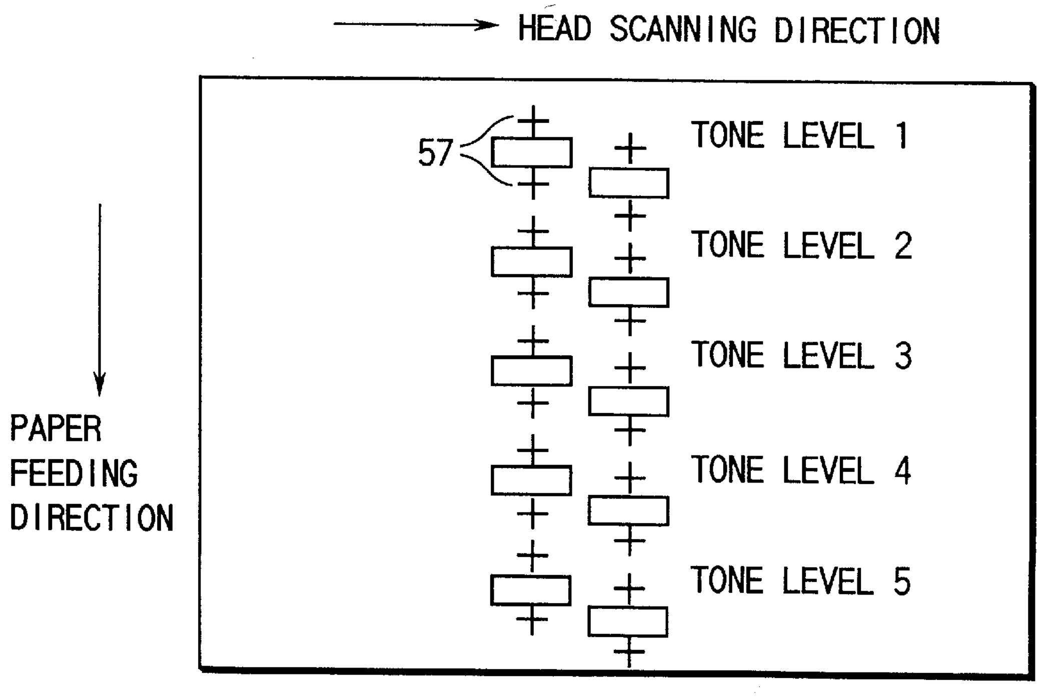
FIG. 6 is a view showing another example of the density unevenness detecting chart.

As the density unevenness detecting chart, one as shown in FIG. 6 may be used. At the time of printing by means of the printer 51, there may be a case in which the printing direction is shifted by errors of the feeding system. Thus, if markers 57 are arranged above and below any pattern of each tone as shown in FIG. 6, density unevenness quantities can be more accurately detected even in the case wherein there are errors in the feeding system. As regards the chart shown in FIG. 6, printing is carried out 2 times for each density in order to improve accuracy still more.

The following will describe a first embodiment of the present invention. In general, density unevenness correction data are different in accordance with tones of print image data. However, the present applicant has experimentally found that if the density unevenness correction data of some tone which is a standard is simply multiplied by a given correction coefficient corresponding to a tone, density unevenness correction data for any other tone can be calculated.

Figure 7:
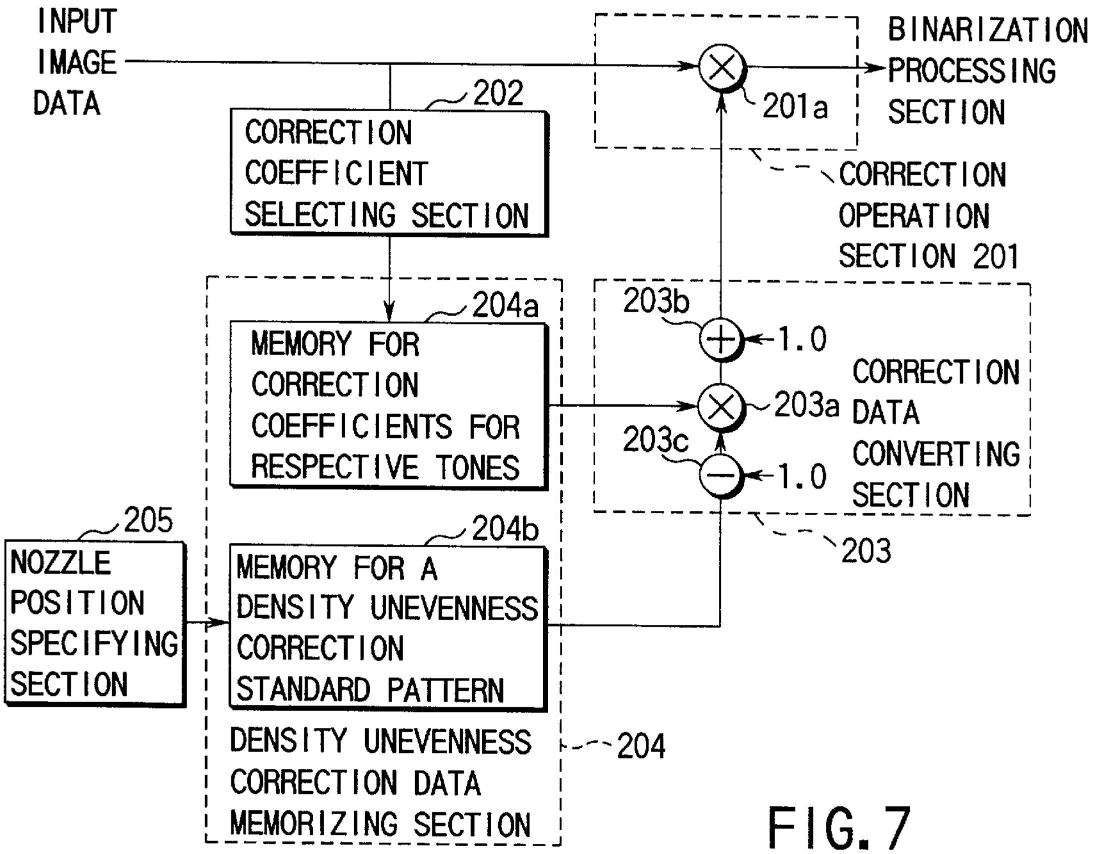
FIG. 7 is a view showing a structure of a printer according to a first embodiment of the present invention.
Figure 8A:
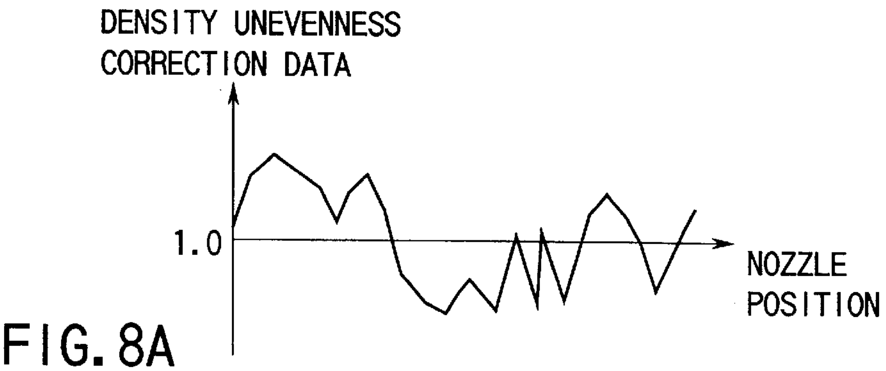
FIG. 8A is a view showing a density unevenness correction data standard pattern.

FIG. 7 is a structure view of a printer according to the first embodiment, for which such experimental results has been considered. In the first embodiment, a density unevenness correction data memorizing section 204 is composed of a memory 204*a* for correction coefficients for respective tones and a memory 204*b* for a density unevenness correction standard pattern. The memory 204*b* for the density unevenness correction standard pattern memorizes only one density unevenness correction standard pattern for a single tone which is a standard, as shown FIG. 8A. A horizontal axial shows nozzle positions, and a vertical axial shows density unevenness correction data for some tone. In the present embodiment, as the density unevenness correction standard pattern, the density unevenness correction data for a tone exhibiting the most conspicuous (greatest) density unevenness is used. It is known that patterns of density unevenness correction data for other tones are different from this standard pattern in amplitude, but their shapes are similar to each other. This makes it possible to obtain the density unevenness correction data for the other tones by multiplying the density unevenness correction standard pattern by a given correction coefficient.

Figure 8B:
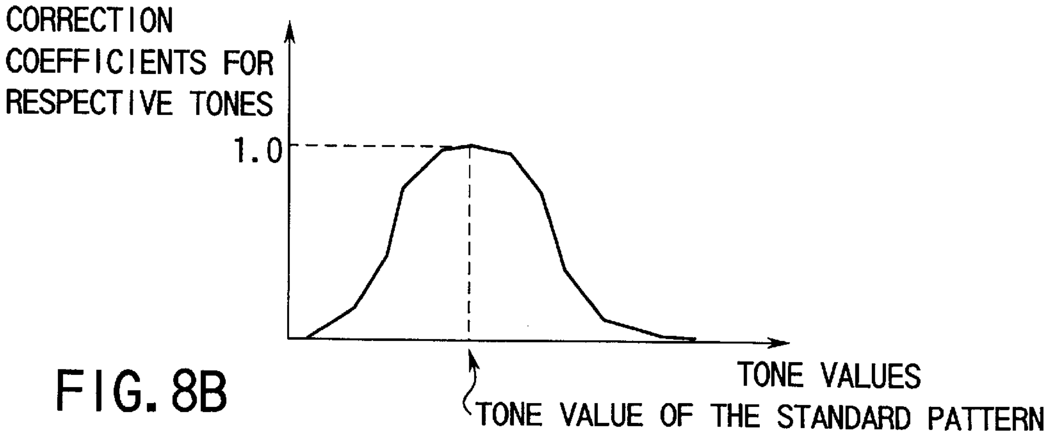
FIG. 8B is a view showing correction coefficients for respective tones which correspond to tone values.

A table as shown in FIG. 8B is memorized in the memory 204*a* for correction coefficients for respective tones. Its horizontal axial shows tone values of print image data and its vertical axial shows correction coefficients for respective tones. In this embodiment, the correction coefficient corresponding to the tone value of the density unevenness correction standard pattern is specified as 1, and correction coefficients are decided so as to decrease as tone values are shifted away from the tone value of the standard pattern.

The memory 204*a* for correction coefficients for respective tones has a reading section for reading the correction coefficient corresponding to the tone of a print image data, and the memory 204*b* for the density unevenness correction standard pattern has a reading section for reading the density unevenness correction data for a specified nozzle position correspondingly to a nozzle specifying signal described later.

A correction coefficient selecting section 202 detects the tone of an inputted print image data, and then outputs the selection signal corresponding to the detected tone. The correction coefficient corresponding to this selection signal is then read from the memory 204*a* for correction coefficients for respective tones and supplied to a correction data converting section 203 as a correction data generating section. Also, the density unevenness correction data for the nozzle position corresponding to the specifying signal from the nozzle position specifying section 205 is read from the memory 204*b* for the density unevenness correction standard pattern and then supplied to the correction data converting section 203.

The correction data converting section 203 is composed of a multiplier 203*a*, and 1-increment adder 203*b*, and 1-decrement subtractor 203*c*. The multiplier 203*b* multiplies the density unevenness correction data that 1 is subtracted, by the 1-decrement subtracted 203*c*, from the density unevenness correction data read from the density unevenness correction data memorizing section 204 by the correction coefficient read from the memory 204*a* for correction coefficients for respective tones. The correction data obtained by adding 1 to the results multiplied by the multiplier 203*a* in the 1-increment adder 203*b* is supplied to a correction operation section 201. In the correction operation section 201, the print image data is subjected to a correction operation, on the basis of this correction data. In this embodiment, the multiplier 201*a* multiplies the print image data by the correction data.

According to this first embodiment, the memory capacity can be reduced to a great extent since only the density unevenness correction data for a single tone is memorized.

The following will describe a variation of the first embodiment. Experiments have demonstrated that the aforementioned pattern of the density unevenness varies dependently on the environment in which the printer is used, that is, air temperature and humidity. Thus, the aforementioned density unevenness correction data may be prepared in accordance with air temperature and humidity, to use the correction data corresponding to the environment at the time of correcting density unevenness.

Figure 9:
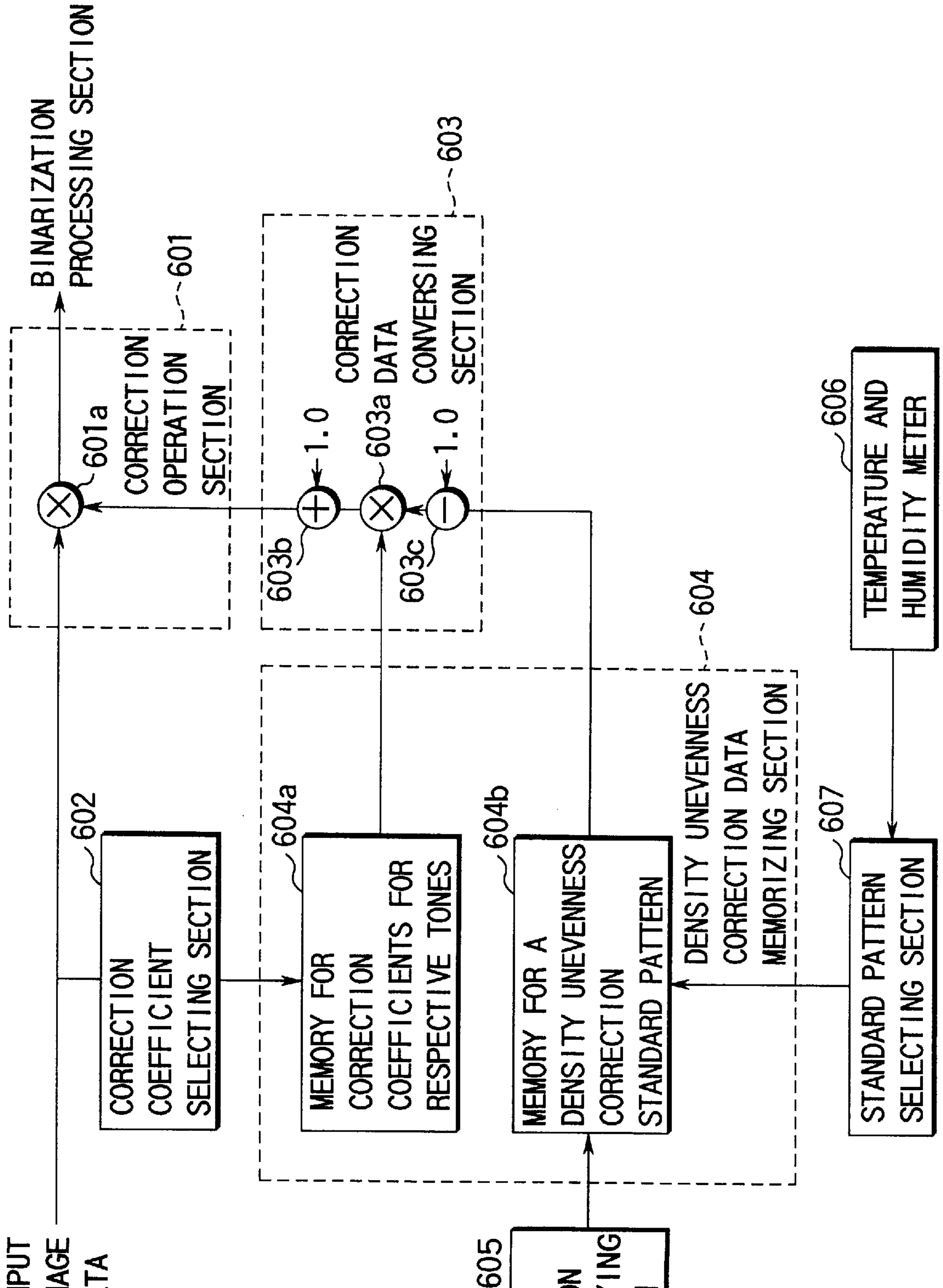
FIG. 9 is a view showing a variation of the first embodiment of the present invention.

FIG. 9 is a view showing a structure of a variation of the first embodiment. A temperature and humidity meter 606 is a meter for measuring the air temperature and the humidity around the printer. Density unevenness correction standard patterns are memorized for respective predetermined temperatures and humidities in a density unevenness correction standard pattern memorizing section 604*b*. For example, data are memorized on 4 environments of 15° C. temperature and 20% humidity, 20° C. temperature and 40% humidity, 25° C. temperature and 60% humidity, and 30° C. temperature and 80% humidity. A standard pattern selecting section 607 judges which standard pattern among the memorized temperature and humidity combinations the temperature and humidity detected by the temperature and humidity meter 606 are closest to, and then the resultant selection signal is supplied to the density unevenness correction standard pattern memorizing section 604*b*. This section 604*b* reads the density unevenness correction data corresponding to the selection signal sent from the standard pattern selecting section 607 and the specifying signal sent from the nozzle position specifying section 605. Subsequent processing is the same as in the first embodiment.

Switching the density unevenness correction data in accordance with the printer-using environment in this way makes it possible to carry out a density unevenness correction with high accuracy.

The following will describe a second embodiment of the present invention.

Figure 10:
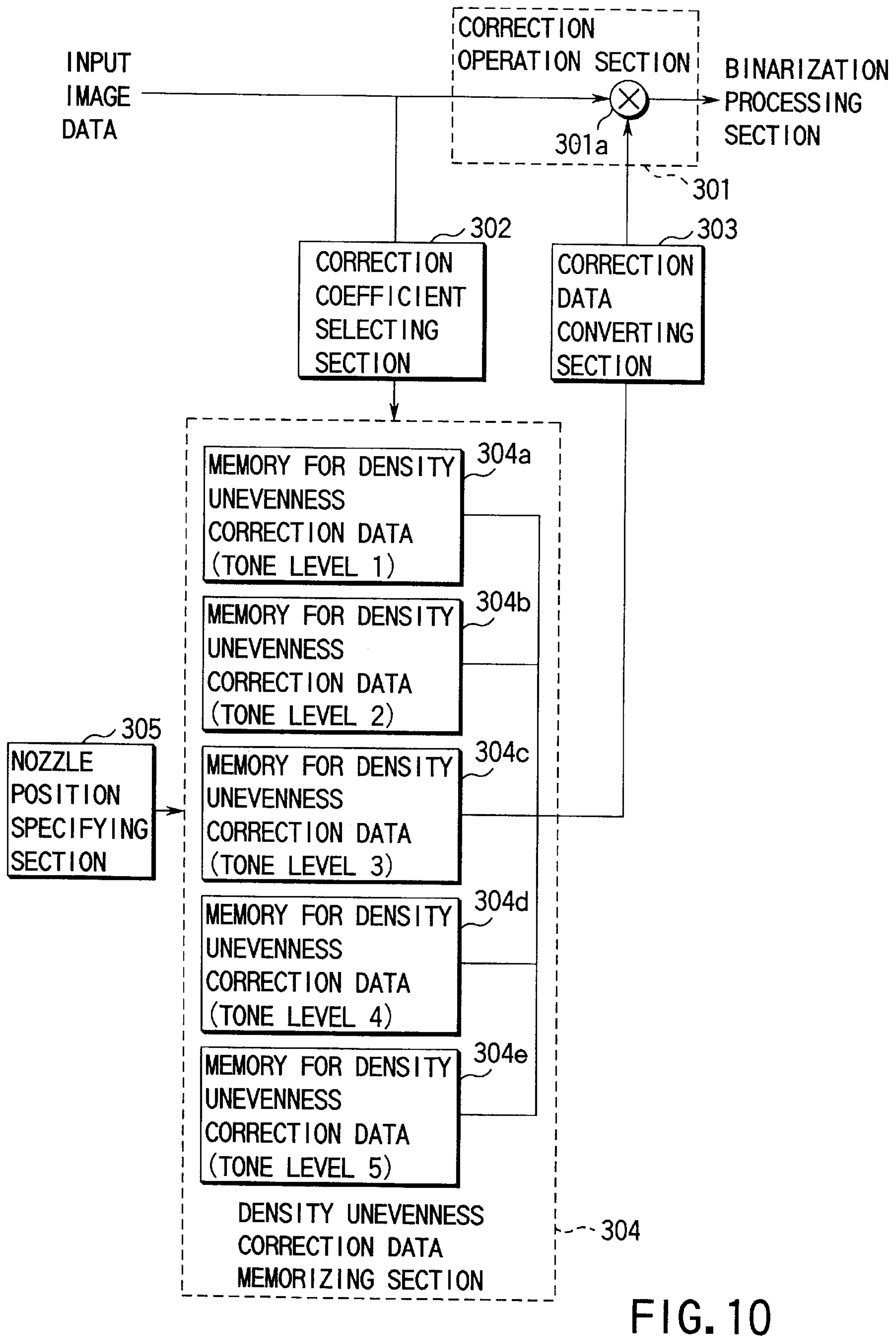
FIG. 10 is a view showing a structure of a printer of a second embodiment of the present invention.

FIG. 10 is a view showing the second embodiment of the present invention. A density unevenness correction data memorizing section 304 in the present embodiment has density unevenness correction data memories 304*a* to 304*e* for memorizing density unevenness correction data corresponding to 5 tones from tone level 1 to tone level 5, and a non-illustrated reading section for reading any density unevenness correction data correspondingly to a selection signal and a nozzle position specifying signal described later. At the time of reading, in this reading section, a table as shown in FIG. 1 is referred to, which shows the relationship between tones of print image data (the horizontal axial) and used correction data (the vertical axial).

Figure 11:
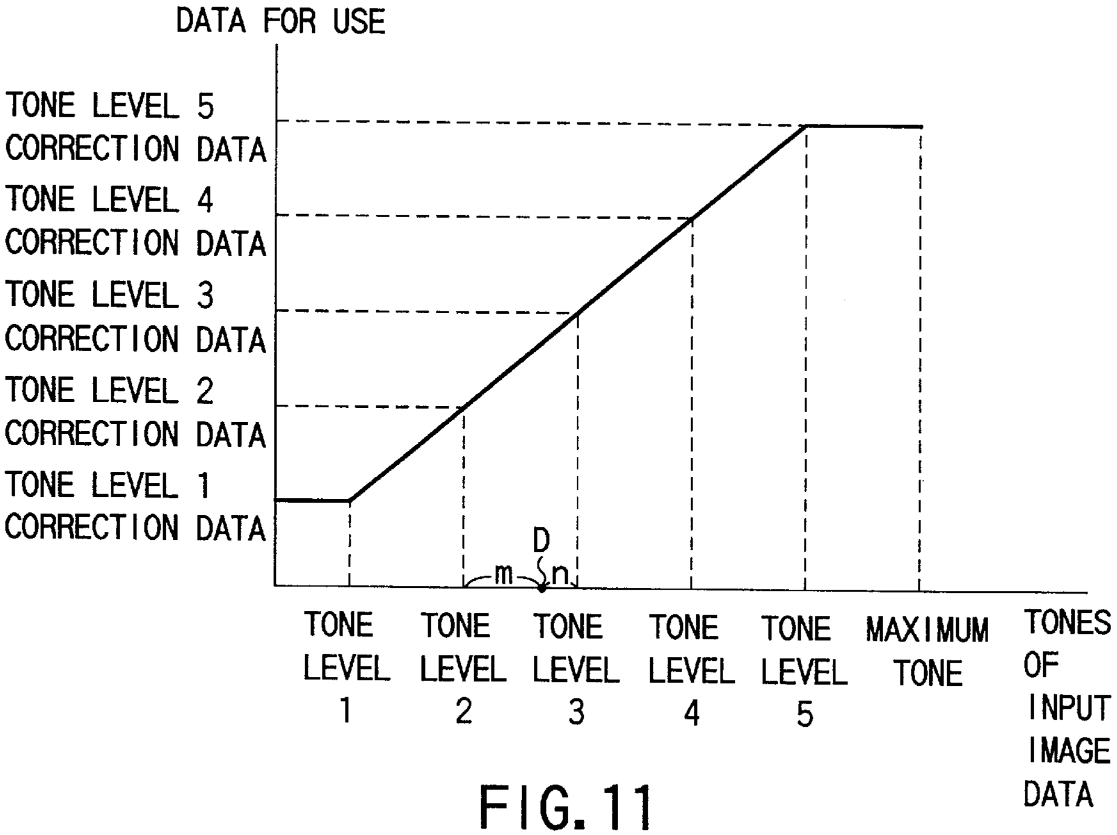
FIG. 11 is a view showing the relationship between tones of print image data and correction data for use.

A density unevenness correction data selecting section 302 detects the tone of an inputted print image data and then the selection signal corresponding to the detected tone is outputted. Next, correspondingly to this selection signal and the specifying signal from the nozzle position specifying section 305, two correction data corresponding to the two tones adjacent to the detected tone are read from the density unevenness correction data memorizing section 304. That is, in FIG. 11, correspondingly to a tone D (this tone D is positioned at a point where the values of the tone levels 2 and 3 are divided internally at a m/n ratio), the correction data for the tone level 2 and the tone level 3 are read as first correction data.

Figure 12:
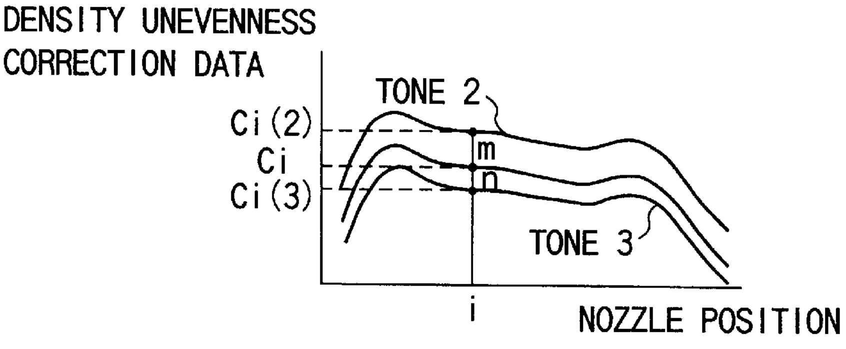
FIG. 12 is a view for explaining a method for obtaining correction data Ci corresponding to tone i of a print image data.

Using the density unevenness correction data for the tone level 2 and the tone level 3, a correction data converting section 303 generates a density unevenness correction data (second correction data) corresponding to the tone D by an interpolation operation. That is, in the relationship between nozzle positions and density unevenness correction data as shown in FIG. 12, the point that the density unevenness correction data for the tone levels 2 and 3 are divided internally at a m/n ratio, and then it is defined as Ci, which is a density unevenness correction data for the tone D. Such a density unevenness correction data Ci can be obtained from the following equation:

$$Ci=(m\times Ci(3)+n\times Ci(2))/(m+n),$$

wherein i represents the position of the nozzle, and Ci(3) is the density unevenness correction data for the tone level 3 about the nozzle i, and Ci (2) is the density unevenness correction data for the tone level 2 about the nozzle i.

In this way, in the present embodiment the density unevenness correction data corresponding to 5 tones are memorized, and two correction data corresponding to the two tones adjacent to the detected tone, among these 5 tones, are read. Thereafter, density unevenness correction data corresponding to any tones (256 tones) are obtained by an interpolation operation using these two correction data. However, in the case in which a tone below the tone level 1 is detected, the density unevenness correction data for the tone level 1 is adopted, and in the case in which a tone over the tone level 5 is detected, the density unevenness correction data for the tone level 5 is adopted. The correction data from a correction data converting section 303 is then supplied to a correction operation section 301. In the correction operation section 301, a multiplier 301*a* multiples a print image data by the correction data in the same manner as in the aforementioned embodiment.

According to this second embodiment, the memory capacity for memorizing the correction data necessary for density unevenness correction can be reduced and the density unevenness correction can be carried out with higher accuracy since only the density unevenness correction data corresponding to the 5 tones are memorized and the correction data for other tones are calculated by an interpolation operation.

Figure 13:
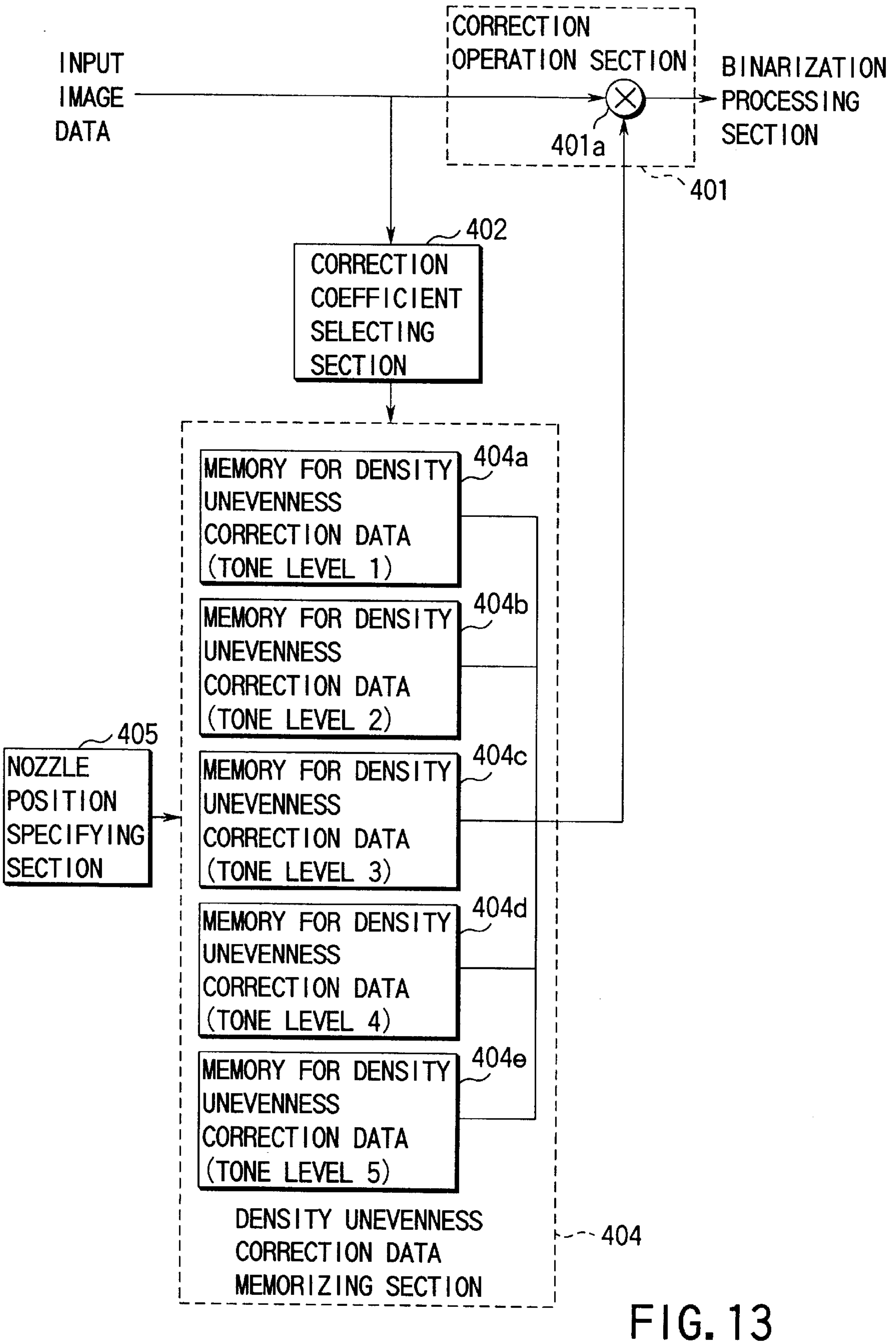
FIG. 13 is a view showing a structure of a printer of a third embodiment of the present invention.
Figure 14:
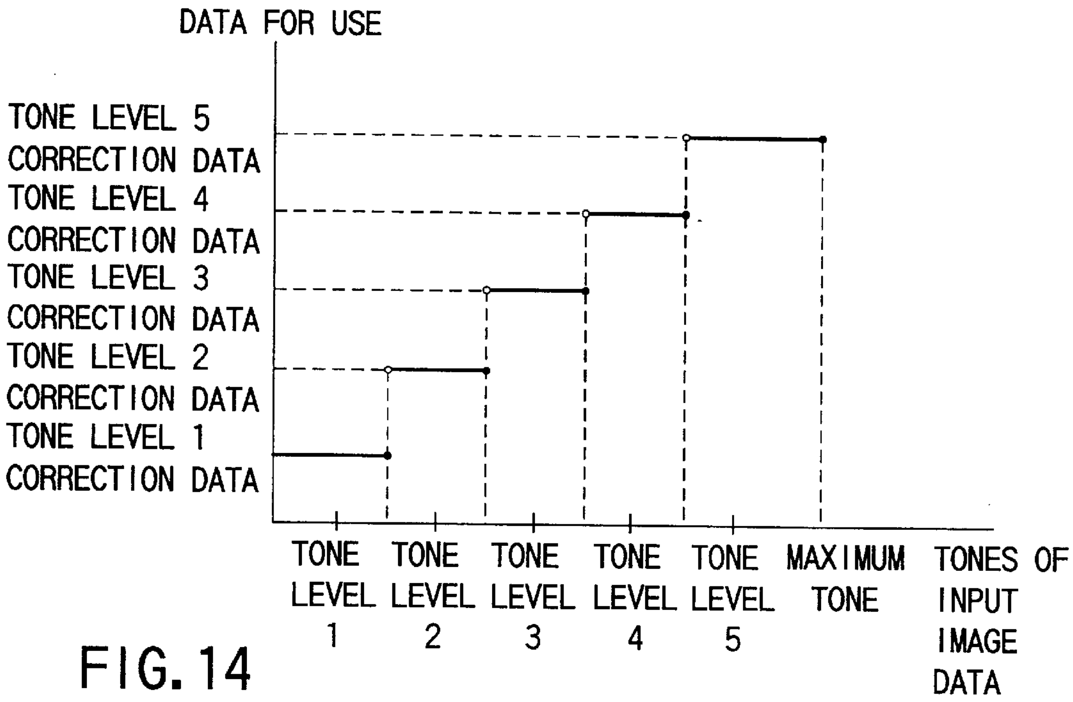
FIG. 14 is a view showing the relationship between tones of print image data and correction data for use.

The following will describe a third embodiment of the present invention. FIG. 13 is a view showing a structure of a printer according to the third embodiment of the present invention. The structure of the third embodiment is a structure wherein the structure of the second embodiment is made simpler, and does not have any correction data converting section. A density unevenness correction data memorizing section 404 in the present embodiment has density unevenness correction data memories 404*a* to 404*e* for memorizing density unevenness correction data corresponding to 5 tones, i.e., from tone level 1 to tone level 5, and a non-illustrated reading section for reading any density unevenness correction data correspondingly to a selection signal and a nozzle position specifying signal described later. At the time of reading, in the reading section, a table, as shown in FIG. 14 is referred to, which shows the relationship between tones of print image data (the horizontal axial) and used correction data (the vertical axial). According to this table, for example, the density unevenness correction data for the tone level 2 corresponds to tones from middle tones between the tone levels 1 and 2 to middle tones between the tone levels 2 and 3. The density unevenness correction data for the tone level 3 corresponds to tones from middle tones between the tone levels 2 and 3 to middle tones between the tone levels 3 and 4. The density unevenness correction data for the tone level 4 corresponds to tones from middle tones between the tone levels 3 and 4 to middle tones between the tone levels 4 and 5. Furthermore, the density unevenness correction data for the tone level 1 corresponds to tones below middle tones between the tone levels 1 and 2. The density unevenness correction data for the tone level 5 corresponds to tones from middle tones between the tone levels 4 and 5 to the maximum tone (the tone 256 in this embodiment). The aforementioned density unevenness correction data are obtained by calculation in the density unevenness correction data calculating section 106 on the basis of the density unevenness quantity detected by the density unevenness quantity detecting section 107 shown in FIG. 2.

A density unevenness correction data selecting section 402 detects the tone of a print image data and then the selection signal corresponding to the detected tone is outputted. Next, correspondingly to this selection signal and the specifying signal from the nozzle position specifying section 405, the correction data corresponding to the detected tone is read from the density unevenness correction data memorizing section 404. For example, in the case in which the detected tone is in the range from the middle tone between the tone levels 1 and 2 to the middle tone between the tone levels 2 and 3, the correction data for the tone level 2 is read.

The density unevenness correction data read from the density unevenness correction data memorizing section 404 in this way is supplied to a correction operation section 401. In the correction operation section 401, the print image data is subjected to a correction operation, using this density unevenness correction data. In this embodiment, a multiplier 401*a* multiplies the print image data by the correction data.

This third embodiment is poorer in density unevenness correction accuracy than the second embodiment, but has a simpler structure since it does not have a correction data converting section.

The following will describe a fourth embodiment of the present invention. In the first, second and third embodiments, the density unevenness correction section is arranged at the previous stage of the binarization processing section; however, the fourth embodiment is characterized in that the density unevenness correction section is arranged inside a binarization processing section 501 to carry out a density unevenness correction for a print image data. As a method for the density unevenness correction, any one of the methods of the first, second and third embodiments can be adopted.

Figure 15:
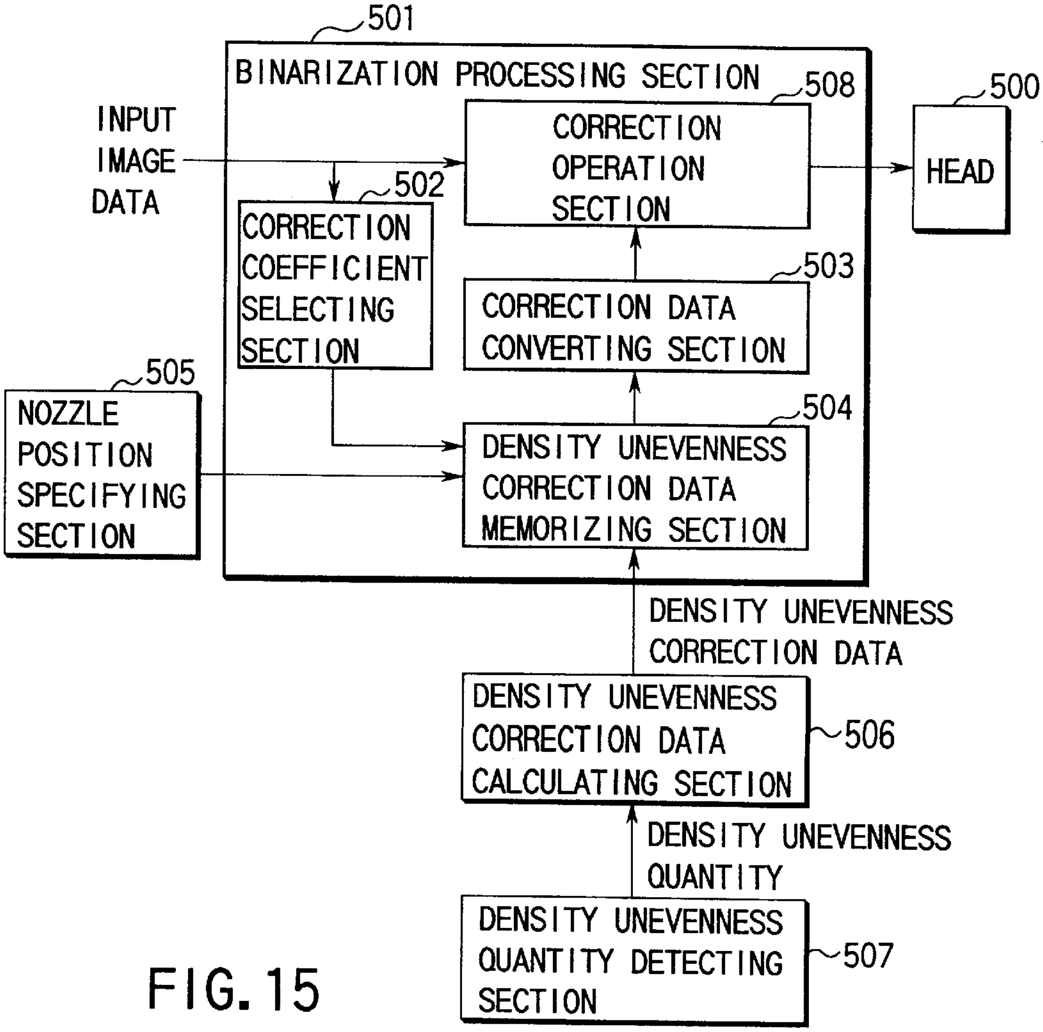
FIG. 15 is a view showing a structure of a printer of a fourth embodiment of the present invention.

Referring to FIG. 15, a density unevenness correction data memorizing section 504 memorizes density unevenness correction data calculated in a density unevenness correction data calculating section 506 on the basis of the density unevenness quantity detected by a density unevenness quantity detecting section 507. The density unevenness correction data are fewer tones (1 or 5 tones) than the number of the tones of all print image data (256 tones).

A density unevenness correction data selecting section 502 detects the tone of a print image data and then outputs the selection signal corresponding to the detected tone. On the basis of this selection signal and a nozzle specifying signal from a nozzle position specifying section 505, the density unevenness correction data corresponding to the detected tone is read from the density unevenness correction data memorizing section 504, and then is supplied to a correction data converting section 503 to convert it into a correction data suitable for an error diffusion section 508. In the case in which the method of the third embodiment is adopted, the correction data in the density unevenness correction data memorizing section 504 is directly supplied to the error diffusion section 508.

Figure 16:
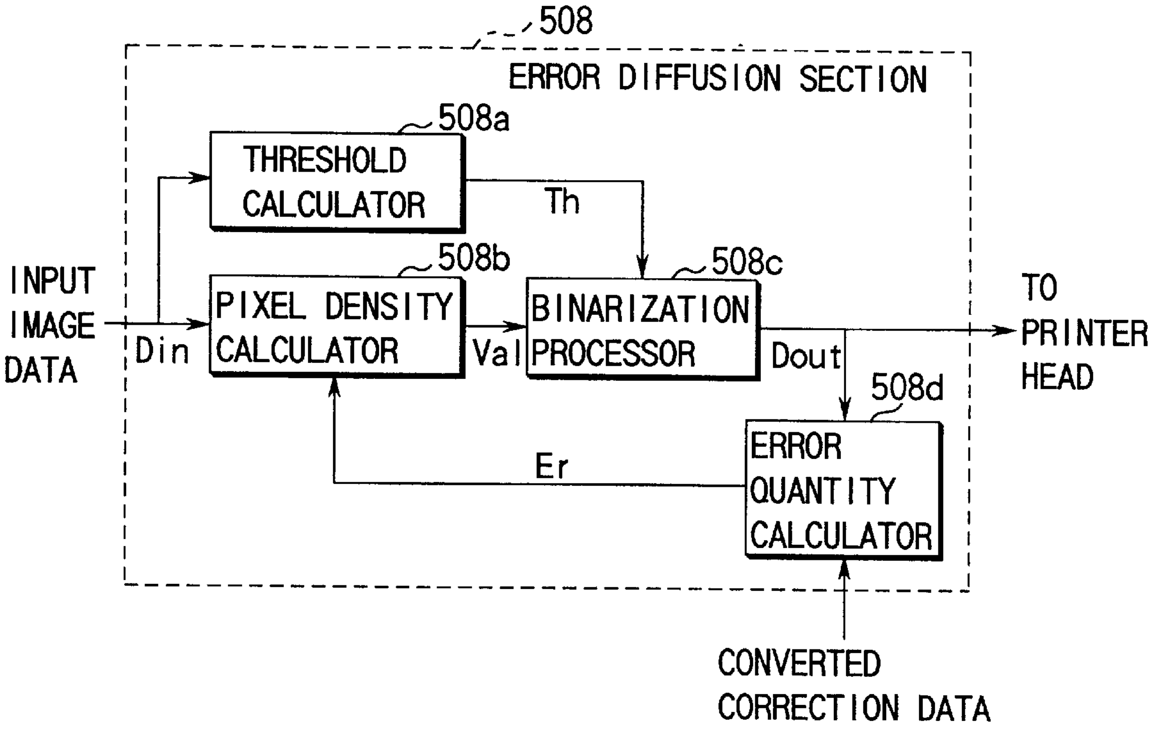
FIG. 16 is a view showing a structure of an error diffusion section shown in FIG. 15.
Figure 17:
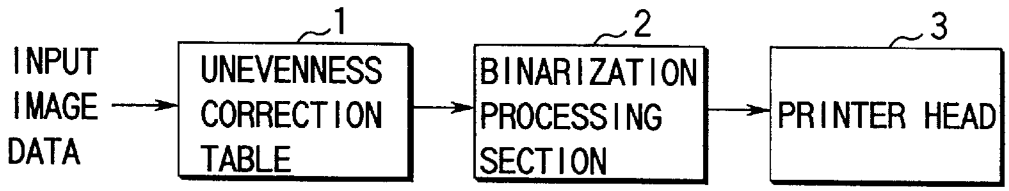
FIG. 17 is a view for explaining conventional density unevenness correction.

The error diffusion processing in the error diffusion section 508 will be described hereinafter. In general, binarization processing is carried out by the error diffusion method or the dither method. According to the error diffusion method, the error generated by a binarization processing of a tone image is diffused into pixels near a pixel to which attention is paid, thereby representing tones. As shown in FIG. 16, the error diffusion section 508 is composed of a threshold calculator 508*a*, a pixel density calculator 508*b*, a binarization processor 508*c*, and an error quantity calculator 508*d*.

In this embodiment, a print image data is represented as Din, and the error quantity generated by a binarization processing in the binarization processor 508*c*(and calculated in the error quantity calculator 508*d*) is represented as Er. In the pixel density calculator 508*b*, the density value Val of the pixel to which attention is paid is calculated from this print image data Din and the error quantity Er on the basis of the following equation:

$$Val=Din+\text{Weight}\times Er;$$

wherein Weight represents a weight coefficient for the pixel into which the error is diffused. The threshold value Th calculated in the threshold calculator 508*a* and this density value Val are compared in the binarization processor 508*c*.

In the case of Val>Th, Dout, which is an output from the binarization processor 508*c*, of 1 is outputted. In the case of Val<Th, Dout of 0 is outputted. The renewal of the error quantity Er is then carried out on the basis of the following equation:

$$Er=Val\times Dout-Ki\times Dout,$$

wherein Ki represents a density unevenness correction data for each nozzle which is beforehand measured correspondingly to the jetting amount of each of the nozzle. In general, the Ki is constant since it is considered that the jetting amounts of the respective nozzles are constant. It is considered that in the case wherein density unevenness arises the jetting amounts vary between the respective nozzles. Therefore, the characteristics of the respective nozzles are reflected by including the density unevenness correction data Ki into the calculation of the error quantity Er, as described above.

According to this fourth embodiment, it is not necessary to dispose any correction operation section separately as in the first, second and third embodiments and thus a small-sized printer can be realized at low costs because a density unevenness correction operation is carried out in the binarization processing section 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printer apparatus comprising:

a head having k (number) printing elements for printing image data;

a printing element selecting section for selecting a printing element driven at the time of printing among the k printing elements of the head; and an image data correcting section for correcting the image data previous to the printing of the image data using the head;

wherein the image data correcting section comprises:

a correction data memorizing section for memorizing a correction data for a certain single tone among n (number) tones that the image data has for each of the printing elements;

a tone detecting section for detecting the tone of the image data corresponding to each of the selected printing elements of the head; and a correction data generating section for generating a correction data for each of the selected printing elements, corresponding to the tone detected by the tone detecting section, by using the correction data memorized in the correction data memorizing section; and wherein the correction data generating section generates correction data for other tones than the single tone by multiplying the correction data memorized in the correction data memorizing section as a standard pattern by given correction coefficients.

2. The printer apparatus according to claim 1, wherein the standard pattern is a correction data for the tone exhibiting the greatest density unevenness, and in the case in which the correction coefficient for the standard pattern is specified as 1, the given correction coefficients are set in such a manner that they gradually decrease as the tones are apart from the tone exhibiting the greatest density unevenness.

3. The printer apparatus according to claim 1, which further comprises an environment detecting section for detecting the environment around the printer, and wherein the correction data memorizing section memorizes a plurality of the correction data corresponding to the environment around the printer, and the correction data generating section selects the correction data corresponding to an environment data obtained by detection in the environment detecting section among the plural correction data memorized in the correction data memorizing section.

4. The printer apparatus according to claim 3, wherein the image data correcting section comprises a converting section for converting the read correction data of m tones into correction data of n tones for each of the selected printing elements.

5. The printer apparatus according to claim 4, wherein the reading section reads out correction data corresponding to two tones adjacent to a tone detected by the tone detecting section, among the m tones, and the converting section generates the correction data of n tones by performing a predetermined interpolation operation using correction data corresponding to the two tones.

6. The printer apparatus according to claim 1, which further comprises a binarization processing section for binarization processing the image data, and wherein the image data correcting section is arranged inside the binarization processing section.

7. The printer apparatus according to claim 1, wherein the correction data memorized in the correction data memorizing section is generated based on a predetermined chart printed by the printer apparatus itself.

8. A printer apparatus comprising:

a head having k (number) printing elements for printing an image data;

a printing element selecting section for selecting a printing element driven at the time of printing among the k printing elements of the head; and an image data correcting section for correcting the image data previous to the printing of the image data using the head;

wherein the image data correcting section comprises:

a correction data memorizing section for memorizing correction data for correcting the image data for each of the printing elements, the number of the correction data corresponding to m (n>m) tones among the n tones that the image data has, and memorizing the total number m×k of the correction data for the k printing elements;

a tone detecting section for detecting the tone of the image data, corresponding to each of the selected printing elements; and a reading section for reading the correction data corresponding to a tone detected in the tone detecting section from the correction data memorizing section, and for performing a correction operation to the image data.

9. The printer apparatus according to claim 8, further comprising a table in which the tone detected by the tone detecting section corresponds to any one of the m tones of correction data, and the reading section reads out correction data corresponding to the tone detected by the tone detecting section among the m tones of correction data referring to the table, and performs a correction operation to the image data.

10. The printer apparatus according to claim 8, which further comprises a binarization processing section for binarization processing the image data, and wherein the image data correcting section is arranged inside the binarization processing section.

11. The printer apparatus according to claim 8, wherein the correction data memorized in the correction data memorizing section is generated based on a predetermined chart printed by the printer apparatus itself.

* * * * *